United States Patent [19]

Gilmour

[11] 4,085,421
[45] Apr. 18, 1978

[54] UNDERWATER VIEWING SYSTEM
[75] Inventor: George A. Gilmour, Severna Park, Md.
[73] Assignee: Westinghouse Electric Corporation, Pittsburgh, Pa.
[21] Appl. No.: 703,157
[22] Filed: Jul. 7, 1976
[51] Int. Cl.² ............... H04N 9/02; H04N 9/04
[52] U.S. Cl. .................... 358/81; 358/41; 358/43
[58] Field of Search ............ 358/41, 42, 43, 50, 358/1, 99, 81; 340/4 R; 350/311; 354/64

[56] References Cited
U.S. PATENT DOCUMENTS

| 2,938,074 | 5/1960 | Trott | 358/42 |
| 2,971,093 | 2/1961 | Garbuny | 358/81 |
| 3,229,089 | 1/1966 | Sasao | 358/81 |
| 3,688,666 | 9/1972 | Tuttle et al. | 354/64 X |

OTHER PUBLICATIONS

Rebikoff, "Underwater Color Cinematography," Journal of the SMPTG, Aug. 1954, p. 55.

Primary Examiner—Richard Murray
Attorney, Agent, or Firm—D. Schron

[57] ABSTRACT

An underwater scene is viewed by a TV camera which in place of the conventional blue, green and red filters has three filters with transmission characteristics within the range of colors passed by the water medium, typical filters being blue-green, green, and yellow-green. The three TV signals from these signals are used to energize the conventional blue, green and red guns of a color TV cathode ray tube (CRT).

8 Claims, 14 Drawing Figures

UNDERWATER VIEWING SYSTEM

BACKGROUND OF THE INVENTION

1. Field of the Invention

Underwater viewing systems.

2. Description of the Prior Art

Television cameras are often used underwater for monitoring certain operations and for viewing underwater objects and animal life. With a monochrome TV system, objects are identified by means of brightness, size, shape and contrast. With a monochrome system however, two areas having different hues can actually show up identically on a black and white or other monochrome TV monitor.

Considerable enhancement in the visibility of objects can be obtained with the use of color TV, however a problem arises due to the fact that the water medium between the color TV camera and the scene to be viewed selectively filters the light such that the effective optical spectrum at ranges for example of 20 to 30 feet, is perhaps only half as wide as it is in air. The effect of the water is to eliminate the violet and red ends of the spectrum such that if a normal color television system were to be used to view an undersea scene containing a range of colors, only objects containing green or green components would be visible on the display. That is, objects viewed through the water appear as various brightnesses and shades of green. A more efficient interpretation of the greenish display could be achieved if the color contrast within the band of wavelengths transmitted by the water medium were increased.

SUMMARY OF THE INVENTION

The present invention effectively increases the color contrast and accordingly improves the visibility of objects within the limited light spectrum of the water. The apparatus of the present invention spreads the relatively narrow underwater optical spectrum by viewing an underwater scene separately through three filters having respective transmission characteristics within the range of colors passed by the water medium, at least two of the filters being other than primary color filters. Thereafter the information passed by the filters is displayed as combinations of primary colors such as by energizing the blue, green and red guns of a conventional color TV CRT.

DESCRIPTION OF THE PREFERRED EMBODIMENT

Figure 1A:
FIG. 1A illustrates the spectral range of colors that are visible to the human eye in terms of wavelengths of light.

In FIG. 1A there is illustrated the spectral range of colors that are visible to the human eye in terms of wavelengths of light with the range of color extending from approximately 4,000 to approximately 7,000 Angstroms indicative of the range from violet to red. The use of underwater color television systems is excellent for close inspection systems, especially the diver-held type. In such situations the subject, camera and lights are all relatively close together, and full color is seen by the TV camera on the color display. Larger deployed systems however, often cannot get close enough or require maximum range to obtain maximum coverage. In such cases, the color displayed on a TV monitor is limited to variations of green.

Figure 1B:
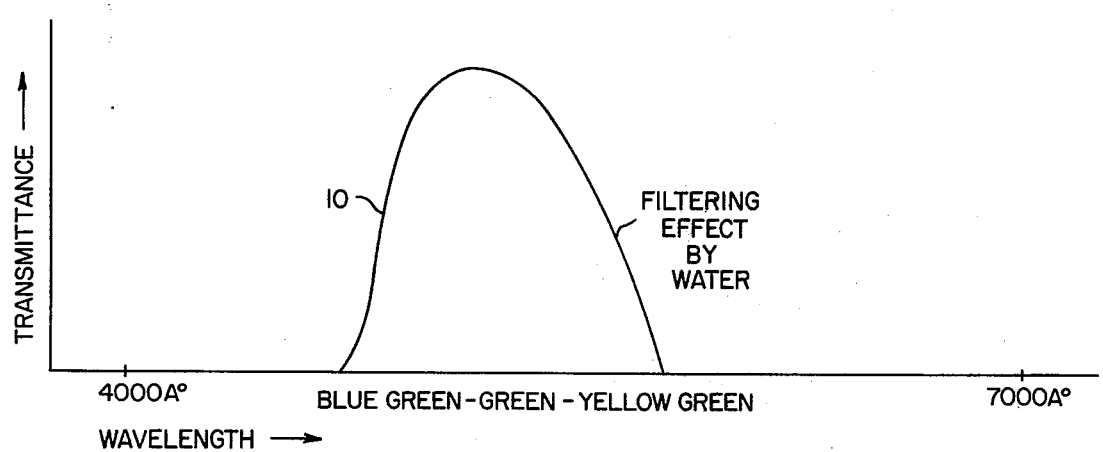
FIG. 1B illustrates the spectral transmission response of the water medium under certain conditions.

Curve 10 of FIG. 1B illustrates this effect. Curve 10 represents the filtering effect due to the water medium between the scene to be observed and the TV camera through a distance of approximately 30 feet. The total color spread available through 30 feet of ocean water ranges from blue-green to yellow-green such that the display on a color TV monitor is essentially monochrome and only marginally better than a black and white rendition. While the present invention does not bring back the colors lost by the filtering effect of the water, the full color spectrum is created to enhance the color contrast and information content of the picture. This is accomplished with the provision of three filters, each being of the type to pass a subrange of colors in the range of colors passed by the water. For example with reference to FIG. 1C, curve 10 represents the spectral transmission response as in FIG. 1B while curves 11, 12 and 13 represent the spectral transmission responses of the respective filters F1, F2 and F3 with that of F2 overlapping F1 and F3.

Scene information passed by these overlapping curves are, in the present invention, displayed as respective other colors including colors outside the range of curve 10. This operation may be accomplished in a number of ways, and to this end reference is made to FIGS. 2A and 2B.

Figure 1C:
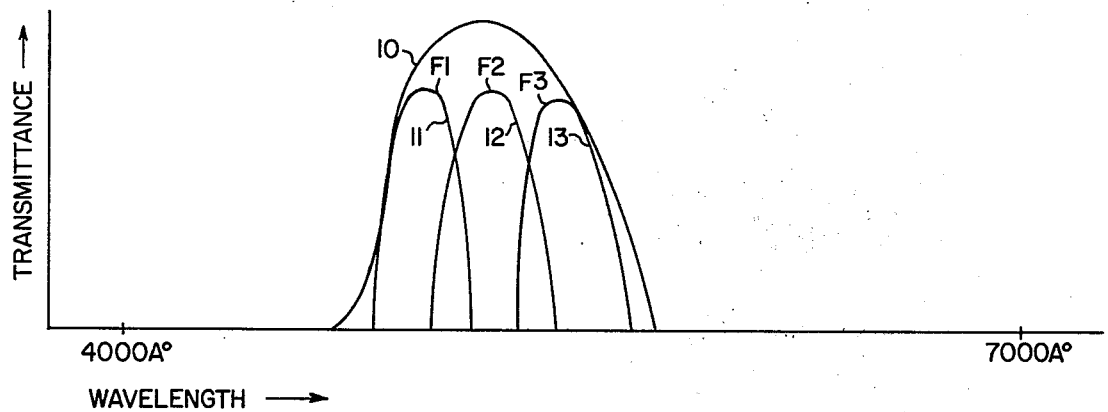
FIG. 1C illustrates the transmission response of the water medium as in FIG. 1B, in addition to the spectral transmission response of a plurality of filters which are utilized in the present invention.
Figure 2A:
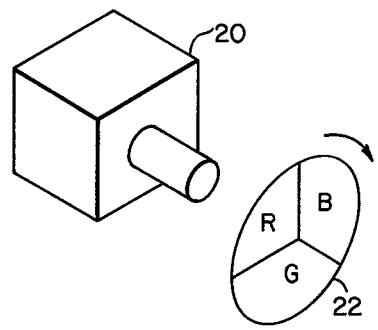
FIG. 2A illustrates one form of conventional color TV camera.

In FIG. 2A there is illustrated one form of conventional TV camera system which includes TV camera 20, and a color wheel 22 which is mounted for rotation in front of the camera lens and operated synchronously with the vertical scan of the camera. The color wheel 22 includes three primary color filters B (blue), G (green), and R (red). In the present invention, and as illustrated in FIG. 2B, filters B, G, and R are replaced by filters F1, F2, and F3 having the transmission characteristics as illustrated in FIG. 1C.

Figure 3A:
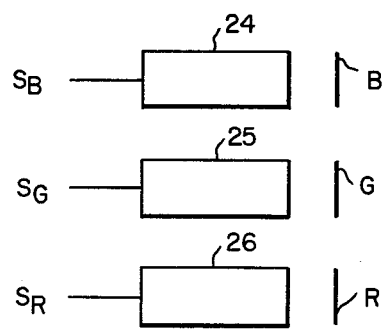
FIG. 3A illustrates another form of conventional color TV camera.

FIG. 3A illustrates another conventional type of TV camera which includes three pick-up tubes 24, 25 and 26 each operable to provide respective signals $S_B$, $S_G$, and $S_R$ in response to viewing the same scene through filters B, G, and R. In the present invention, and as illustrated in FIG. 3B, the normally provided filters B, G, and R are replaced with filters F1, F2 and F3 such that the tubes provide respective signals $S_1$, $S_2$, and $S_3$ indicative of the same scene as viewed through respective filters F1, F2, and F3.

Figure 2B:
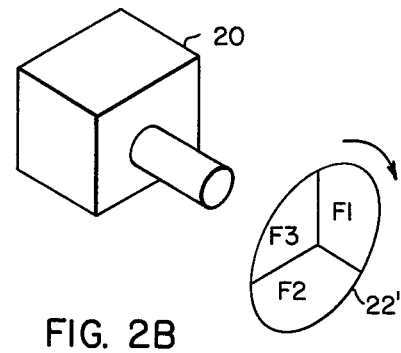
FIG. 2B illustrates the camera of FIG. 1 modified in accordance with the teachings of the present invention.
Figure 3B:
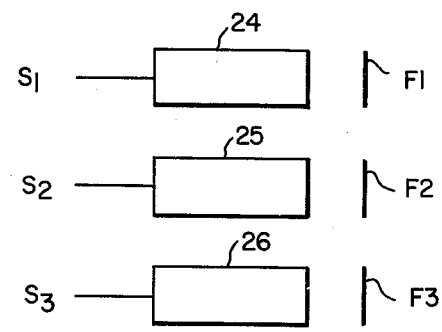
FIG. 3B illustrates the apparatus of FIG. 3A modified in accordance with the teachings of the present invention.
Figure 4:
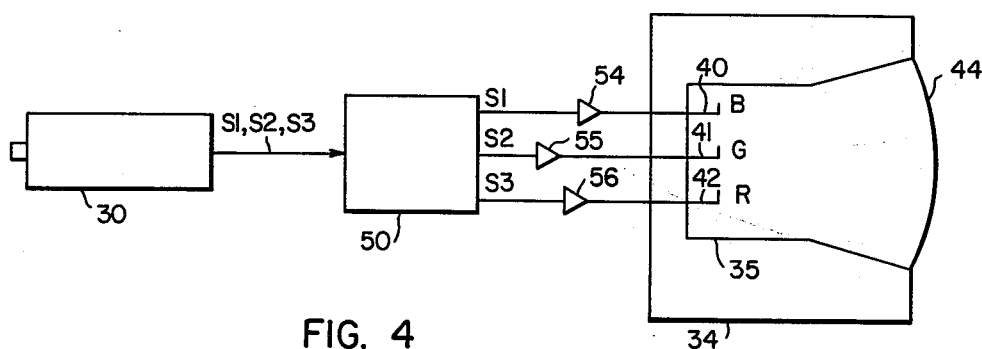
FIG. 4 is a block diagram illustrating an embodiment of the present invention.

The scene indicative signals whether it be provided sequentially as by the system in FIG. 2B, or simultaneously as by the system in FIG. 3B, are utilized to energize the blue, green and red phosphors of a conventional color CRT. Thus in FIG. 4, there is illustrated a TV camera 30 which provides the scene indicative signals $S_1$, $S_2$, and $S_3$ as viewed through the three filters F1, F2, and F3. The viewing of the information contained in these signals is accomplished with the provision of color TV monitor 34 which includes a conventional color CRT 35 having blue, green, and red guns 40, 41 and 42 for energizing the blue, green, and red phosphors on the face 44, as is conventional.

If TV camera 30 is of the sequential color type such as illustrated in FIG. 2B, the frame rate thereof will be less than the frame rate of a standard monitor. Accordingly, there may be provided scan converter apparatus 50 which will assemble the picture provided by camera 30 for proper presentation on the monitor 34. Such sequential color cameras and scan converters are well known to those skilled in the art and may be similar to the camera and scan converter apparatus which provided television pictures from outer space.

In order to be able to enhance or reject selected parts of the light spectrum to improve visibility of particular objects of slightly different hues, there is provided amplifier means 54, 55 and 56 for selectively changing the signal levels of $S_1$, $S_2$, and $S_3$ respectively.

Figure 5:
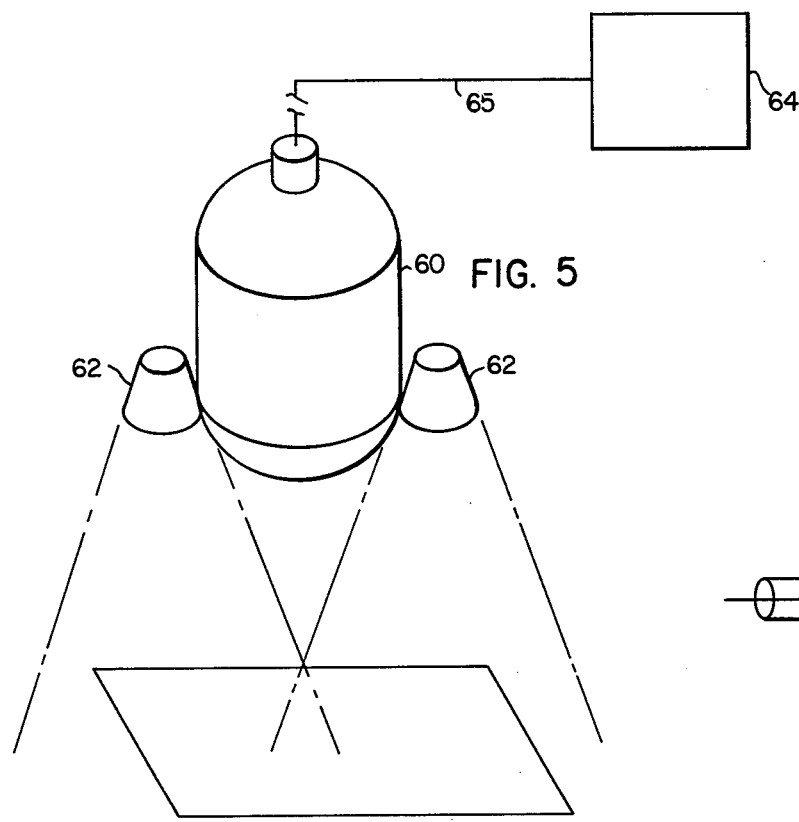
FIG. 5 illustrates the apparatus in a typical environmental use.

In normal operation, and as illustrated in FIG. 5, the TV camera would be enclosed in waterproof housing 60 which may also be designed to withstand the pressures encountered at deep operating depths. The apparatus may include lights 62 for illuminating the scene to be viewed. TV signals from the camera are provided to a control and display unit 64 by means of cable 65 which may also be operable to supply the necessary operating potentials to the camera and lighting equipment.

As was stated, for some operational situations such as close proximity of the camera to the scene to be viewed, the filter effect of the water medium is not that great as to prevent normal color viewing. Accordingly, means may be provided for viewing nearly correct color at close ranges and for viewing the spread spectrum color at, not only maximum range, but at intermediate ranges where the filter effect of the water may vary.

Figure 6:
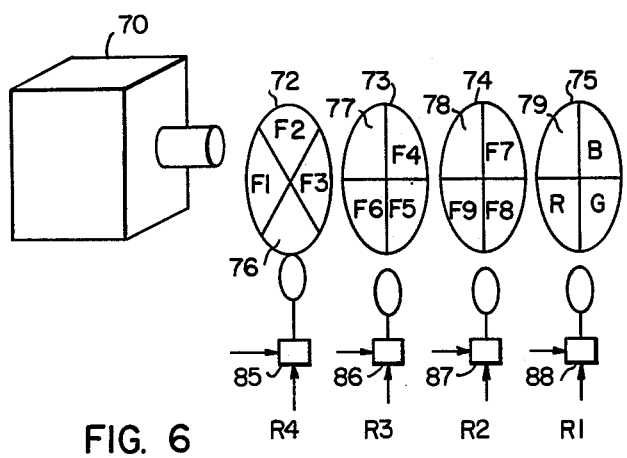
FIG. 6 illustrates a modification of the present invention for use at various ranges.

FIG. 6 illustrates one of a number of ways wherein the present invention may have variable range capability. A TV camera 70 is provided and is of the design illustrated in FIGS. 2A and 2B. Disposed in front of the camera for operation about a common axis is a plurality of color wheels 72 to 75 each being divided into four sectors, three of which include filters and the fourth of which does not. The color wheel 72 includes filters F1, F2, and F3 with a blank portion 76. Color wheel 73 has filters F4, F5, and F6 with a blank portion 77; color wheel 74 has filters F7, F8, and F9 with a blank portion 78; and color wheel 75 has the conventional blue, green, and red filters with a blank portion 79.

Drive and engagement devices 85 through 88 are provided for respective color wheels 72 to 75 and upon receipt of selected signals R4 through R1 would engage a particular one or combination of color wheels. Thus, in FIG. 6, with signal R4 being provided to drive and engagement device 85, color wheel 72 is rotated in front of the lens of the camera 70 while the remaining color wheels have their blank portions lined up and have no effect. This situation is identical to that previously described in FIG. 2B.

For a closer range where the filtering effect of the water is not as great, signal R3 may be provided to put filters F4, F5, and F6 into operation. At still closer ranges, signal R2 may be provided to place filters F7, F8, and F9 into operation, and at close ranges signal R1 may be provided so that the system may operate as a normal color system described in FIG. 2A.

By proper design of the filters, different combinations of signals R4 to R1 may be provided so that more than one color wheel is put into operation to effectively vary the range of operation. In such instance, the operative filter then is made up of one or more filter elements.

Figure 7:
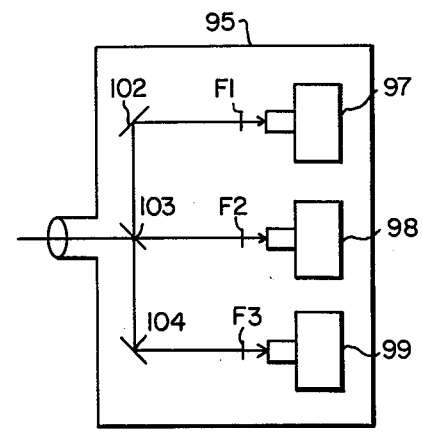
FIG. 7 illustrates another embodiment of the present invention utilizing photographic cameras.

The invention thus far described has been explained with respect to a color TV system. The principles however, are equally applicable to the field of photography. For example in FIG. 7, underwater viewing device 95 includes means for obtaining three photographs of the same scene. This is accomplished with the provision of cameras 97, 98, and 99 having respective filters F1, F2, and F3 in the optical path thereof. Light from the scene is provided to the cameras by means of mirrors 102, 103, and 104, or in any other well known manner.

Figure 8A:
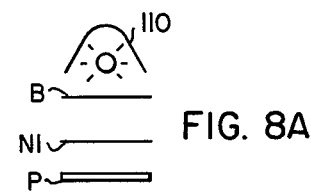
FIGS. 8A, 8B and 8C illustrate the steps in developing the films of the cameras of FIG. 7.
Figure 8B:
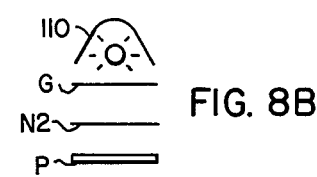
Figure 8C:
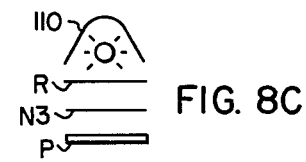

The films are then developed with respective slides therefrom of the same scene being utilized to make the final display, or print, and to this end reference is made to FIGS. 8A to 8C.

In FIG. 8A, the slide N1 is at a position intermediate the light source 110 with blue filter B, and color print P. After proper exposure, and as illustrated in FIG. 8B, the slide N2 from camera 98 is utilized in conjunction with a green filter to expose the print and thereafter, as illustrated in FIG. 8C, the slide N3 from camera 99 is utilized in conjunction with a red filter to expose the print P, thereby resulting in a final print with superior contrast than a color picture of the scene taken with a single camera.

Although the above techniques as described with respect to positive transparency color slides, the basic concept is also applicable to negative film techniques.

I claim as my invention:

1. An underwater viewing system comprising:
   A. TV camera means for viewing an underwater scene and developing three color signals indicative thereof;
   B. three optical color filters positioned relative to said TV camera means that said color signals are respectively indicative of the color passed by said filters;
   C. each said filter being of a type to pass a subrange of colors in the range of colors passed by the water medium between said scene and said TV camera means with two of said filters being other than primary color filters;
   D. color TV display means including color phosphors; and
   E. means responsive to said color signals for selectively energizing said phosphors.

2. Apparatus according to claim 1 wherein:
   A. said color phosphors are three primary color phosphors.

3. Apparatus according to claim 1 wherein:

A. said filters have respective spectral transmission characteristics one of which overlaps with the other two.

4. Apparatus according to claim 3 wherein:

A. said one overlapping filter characteristic is provided by a green filter.

5. Apparatus acording to claim 1 which includes:

A. amplifier means for selectively modifying said color signals.

6. Apparatus according to claim 1 which includes:

A. a plurality of other optical filters with selected spectral transmission characteristics; and B. means for selectively employing said other filters to accommodate for different ranges of colors passed by said water medium.

7. Apparatus according to claim 6 wherein:

A. said plurality includes primary color filters.

8. A method of enhancing contrast of a scene viewed through a water medium comprising the steps of:

A. optically filtering the scene through a plurality of different filters having spectral transmission characteristics within that passed by the water medium; and B. displaying the filtered scenes as a combination of primary colors.

* * * * *